(No Model.) 4 Sheets—Sheet 1.
W. THIELMANN.
METHOD OF MAKING PIPE CONNECTIONS OF WELDABLE MATERIAL.

No. 459,318. Patented Sept. 8, 1891.

Witnesses:
C. Sedgwick
J. M. Ritter

Inventor:
W. Thielmann,
By Munn & Co.
Attorneys.

(No Model.) 4 Sheets—Sheet 2.
W. THIELMANN.
METHOD OF MAKING PIPE CONNECTIONS OF WELDABLE MATERIAL.
No. 459,318. Patented Sept. 8, 1891.
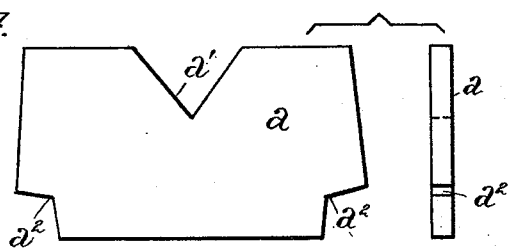
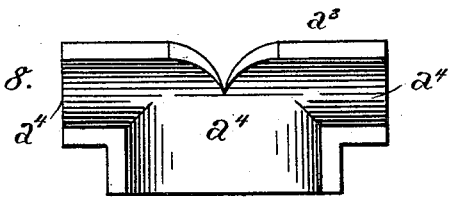
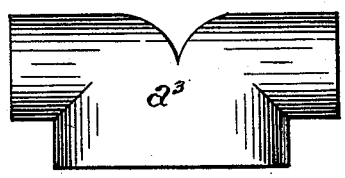
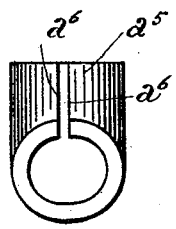
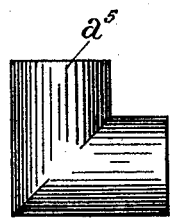
Witnesses:
C. Sedgwick
J. M. Ritter
Inventor:
W. Thielmann
By Munn & Co.
Attorneys (No Model.) 4 Sheets—Sheet 3.

W. THIELMANN.
METHOD OF MAKING PIPE CONNECTIONS OF WELDABLE MATERIAL.

No. 459,318. Patented Sept. 8, 1891.

Witnesses:
C. Sedgwick
J. M. Ritter

Inventor:
W. Thielmann
By Munn & Co.
Attorneys.

(No Model.) 4 Sheets—Sheet 4.
W. THIELMANN.
METHOD OF MAKING PIPE CONNECTIONS OF WELDABLE MATERIAL.
No. 459,318. Patented Sept. 8, 1891.
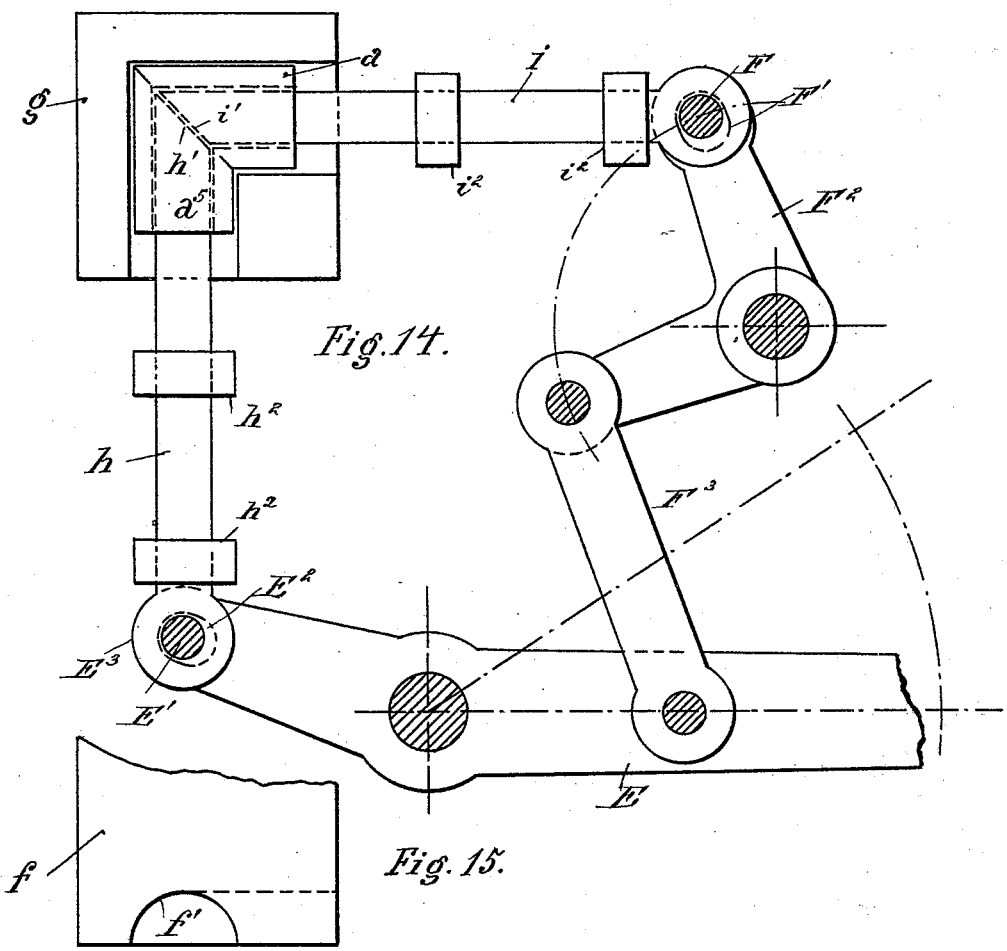
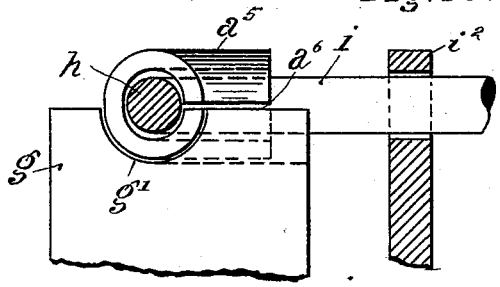
Witnesses:
C. Sedgwick
J. M. Ritter
Inventor:
W. Thielmann
By Munn & Co.
Attorneys.

UNITED STATES PATENT OFFICE.

WILHELM THIELMANN, OF STYRUM, NEAR MÜLHEIM, GERMANY, ASSIGNOR TO THYSSEN & COMPANY, OF SAME PLACE.

METHOD OF MAKING PIPE CONNECTIONS OF WELDABLE MATERIAL.

SPECIFICATION forming part of Letters Patent No. 459,318, dated September 8, 1891.

Application filed May 16, 1889. Serial No. 310,993. (No model.) Patented in England April 1, 1889, No. 5,528; in Luxemburg April 1, 1889, No. 1,115; in France April 1, 1889, No. 197,117; in Belgium April 1, 1889, No. 85,630; in Switzerland June 25, 1889, No. 1,145; in Italy June 30, 1889, XXIII, 25,356, and L, 263; in Germany August 24, 1889, No. 48,271, and in Austria-Hungary November 26, 1889, No. 36,975 and No. 58,459.

*To all whom it may concern:*

Be it known that I, WILHELM THIELMANN, a subject of the King of Prussia, residing at Styrum, near Mülheim-on-Ruhr, in the Kingdom of Prussia, Germany, have invented a new and Improved Method of Manufacturing Angle-Pipe Connections of Weldable Materials, (for which Letters Patent have been granted in the following countries, viz: England, No. 5,528, dated April 1, 1889; Germany, No. 48,271, dated August 24, 1889; Switzerland, No. 1,145, dated June 25, 1889; Austria-Hungary, No. 36,975 and No. 58,459, dated November 26, 1889; Luxemburg, No. 1,115, dated April 1, 1889; France, No. 197,117, dated April 1, 1889; Belgium, No. 85,630, dated April 1, 1889; Italy, XXIII, 25,356, and L, 263, dated June 30, 1889,) of which the following is a full, clear, and exact description.

This invention relates to the manufacture of angle-pipe-connecting joints for pipes, and has for its object to provide a simple and effective method of manufacturing angle-pipe joints, as hereinafter described and claimed.

Reference is to be had to the accompanying drawings, forming a part of this specification, in which similar letters of reference indicate corresponding parts in all the figures.

Figure 6:
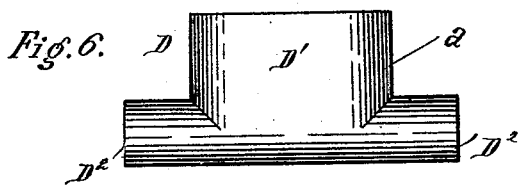
Figure 4:
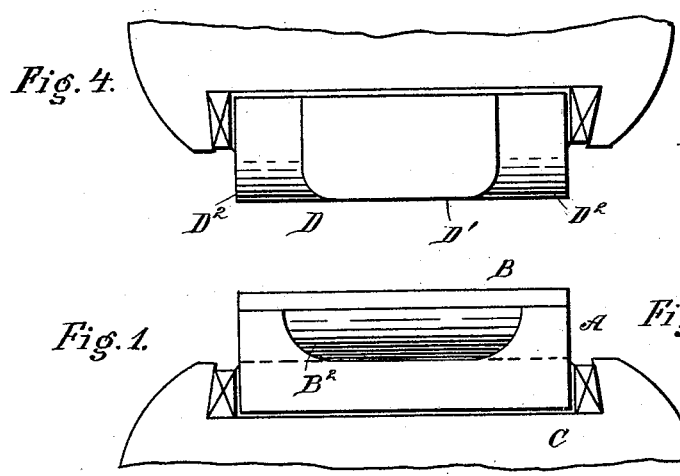
Figure 5:
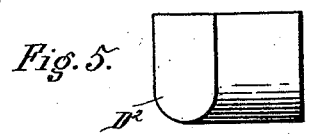
Figure 1:
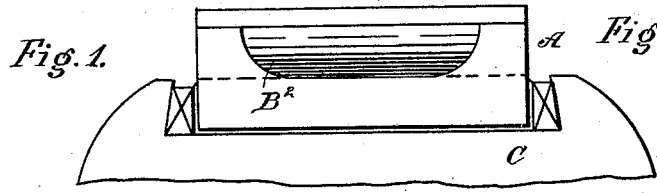
Figure 3:
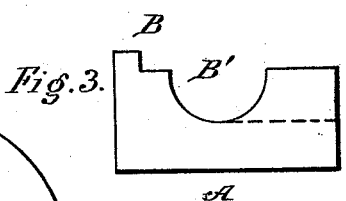
Figure 2:
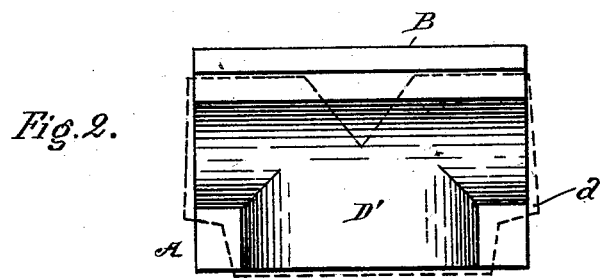
Figure 13:
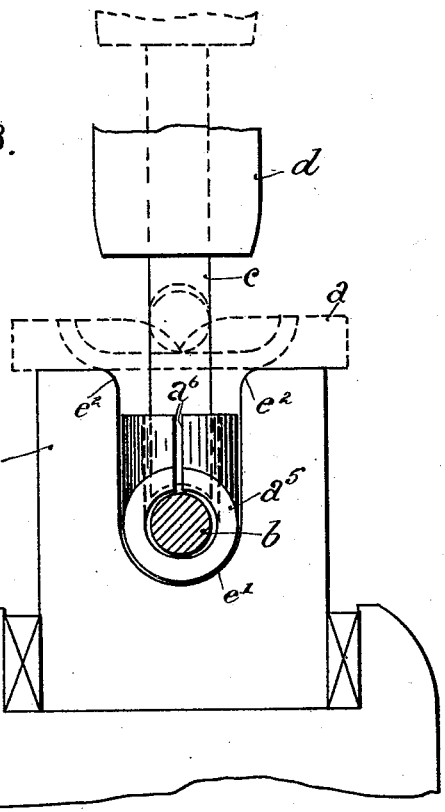
Figure 17:
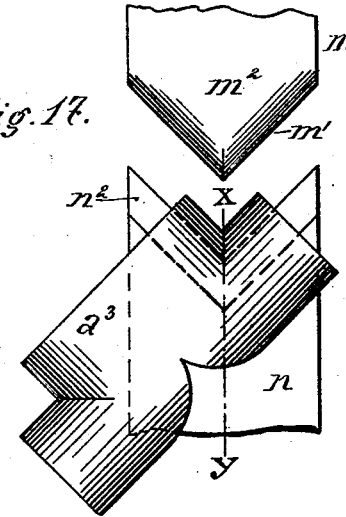
Figure 18:
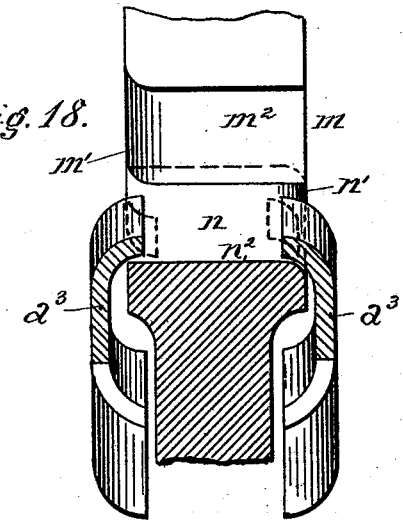

Figure 1 is a view in elevation of the matrix of a metal-stamping machine. Fig. 2 is a plan view thereof. Fig. 3 is a side view thereof. Fig. 4 is a view in elevation of the die employed with the matrix shown in Figs. 1, 2, and 3. Fig. 5 is a view of a portion of the die. Fig. 6 is a plan view of the under side of the die. Fig. 7 is a plan and edge view of a metal blank employed in carrying out this invention. Fig. 8 is a plan view thereof after being stamped by the matrix and die shown in Figs. 1 to 6, inclusive. Fig. 9 is a reverse view of the stamped blank shown in Fig. 8. Fig. 10 is an edge view thereof. Fig. 11 is a front view, and Fig 12 is a side view, of the blank shown in Figs. 7 to 10, inclusive, after being bent into the form of an angle-pipe connection. Fig. 13 is a view in elevation of a machine for forming the angle-pipe connection shown in Figs. 11 and 12. Fig. 14 is a plan view, partly in horizontal section and broken away, of a machine for welding the edges of the angle-pipe connection shown. Fig. 15 is a view of one of the dies employed in the machine shown in Fig. 14. Fig. 16 is a view, partly in vertical section and broken away, of the machine shown in Fig. 14, with the angle-pipe connection shown in Figs. 11 and 12 in position. Fig. 17 is a view in elevation of a portion of a machine with blanks in position for chamfering the overlapping edges of two blanks, similar to that in Fig. 8; and Fig. 18 is a vertical section thereof on the line $x\ y$ of Fig. 17.

In carrying out this invention a blank of suitable shape to be formed into an angle-pipe joint is cut out of malleable cast-iron, steel, or other metal, and is bent while hot by a suitable machine to the shape of the angle-pipe joint with its edges forming the seam adjacent to each other. The molded angle-pipe joint is then placed on the mandrels of a machine and the adjacent edges of the molded pipe-joint while in a heated condition are welded together by being compressed in the machine.

To illustrate the method of manufacturing angle-pipe joints in accordance with this invention, a blank $a$, as shown in Fig. 7, is first stamped from a sheet of weldable material. The blank $a$ is then heated and in a red-hot condition is placed on the matrix A, as shown in dotted lines in Fig. 2. The matrix A consists of a bed-plate or block, formed with the rib or vertical flange B, against which the edge of blank $a$ abuts, the narrow semicircular groove B′ extending across the block, and the broad semicircular groove B², extending from the groove B′ to the front of the block. The matrix A is clamped in a suitable support C.

D indicates a die or punch formed with the central portion D′ adapted to fit into the groove B² and part of the groove B′, and the lateral extensions D² adapted to fit into the groove B′. The blank $a$, being formed with the large central notch $a'$ and the opposite corner notches $a^2$, upon being pressed into the grooves in the matrix A by the die D assumes the shape shown in Figs. 8 and 9—that is, the stamped piece $a^3$ with semicircular hollow portions $a^4$. The piece $a^3$ is then placed on the bed-plate $e$, as shown in dotted lines in Fig. 13. The bed-plate $e$ is formed with an oblique semi-cylindrical socket $e'$, having rounded edges $e^2$.

$b$ indicates an obliquely-extending cylindrical mandrel, the diameter of which is slightly less than the interior of the angle-pipe joint to be formed. The mandrel $b$ is adapted to be moved into the socket $e'$, and is formed with a perpendicular mandrel $c$, having its lower end of semicircular form and mounted in a vertically-movable die $d$.

By means of the foregoing construction when the die $d$ is moved downward the piece $a^3$ is caused to assume the shape shown in Figs. 11 and 12—that is, the pipe elbow-joint $a^5$ having a seam with the ununited edges $a^6$. In order to unite the edges $a^6$ by welding, in accordance with this invention, the elbow-joint $a^5$ is placed in a die $g$, having a semicircular groove $g'$, and mandrels $h$ and $i$ are inserted in the elbow-joint $a^5$, so that their beveled ends $h'$ and $i'$ abut.

The mandrels $h$ and $i$ may be operated by any suitable means and, as shown, preferably by means of the following mechanism: A lever-arm E is pivotally connected at one end with mandrel $h$ by means of a pin $E'$, engaging a slot $E^2$ in a ring $E^3$ on the end of mandrel $h$. The end of mandrel $i$ is connected by a pin F with a slot $F'$ in the end of one of the arms of a bell-crank lever $F^2$, the other arm of which is pivotally connected by a link $F^3$ with the lever-arm E. The mandrels $h$ and and $i$ are adapted to slide in the straps or bearings $h^2$ $i^2$, and by means of the foregoing described mechanism may be readily inserted into and withdrawn form the angle-pipe joint.

$f$ indicates a die with an angular semicircular groove $f'$, adapted to fit over the elbow-joint $a^5$. When the elbow-joint $a^5$ is placed in the die $g$, as above stated, it is in a red-hot condition, and the mandrels $h$ and $i$ being located within the elbow-joint, the die $f$ is forced against the elbow-joint by means of pressure administered steadily, or by a push or blow. In this way the edges $a^6$ are welded together and the pipe-joint section completed. For larger angular pipe-joint sections, after the edges have been bent up, as shown in Fig. 8, the edges that are to be welded together must be chamfered, so that the resulting joint shall not be square, but shall overlap obliquely.

In Fig. 18 is shown a stamp $m$ and die $n$ for chamfering the edges, having the angular ends $m^2$ $n^2$ with rounded edges $m'$ and $n'$, respectively. Two of the stamped pieces $a^3$ are placed with a V-shaped angular corner between the dies $m$ and $n$, as shown in Figs. 17 and 18, so that as the dies are brought together the edges of the pieces $a^3$ are chamfered. In this method, therefore, the bending and welding of the angular pipe-joint sections takes place simultaneously at all points instead of, as in the old method, by hand manufacture, where the bending of the edges and the welding had to be carried out for each of the various parts in succession, requiring repeated reheating.

The novel and essential features of this invention therefore consist in the simultaneous bending of all the edges of the blank and in the subsequent simultaneous welding of all the joints of the angular pipe-joint section.

Having thus fully described my invention, I claim as new and desire to secure by Letters Patent—

The herein-described method of forming L-shape pipe-couplings, which consists in cutting a rectangular blank $a$ with a central V-notch $a'$ in its upper edge and notches $a^2$ $a^2$ in its lower corners, then bending the blank in direction of its length to form the hollows $a^4$ $a^4$ and transversely to form the other hollow $a^4$, then bending the blank transversely to bring its edges into register to impart to the blank its permanent shape, then heating the coupling to a welding heat, and finally welding the edges $a^6$ simultaneously together to complete the coupling, substantially as set forth.

In testimony whereof I have signed my my name to this specification in the presence of two subscribing witnesses.

WILHELM THIELMANN.

Witnesses:
 ROBERT WILKE,
 ROBERT BLERBERG.